US006119178A

United States Patent [19]

Martin et al.

[11] Patent Number: 6,119,178

[45] Date of Patent: Sep. 12, 2000

[54] COMMUNICATION INTERFACE BETWEEN REMOTE TRANSMISSION OF BOTH COMPRESSED VIDEO AND OTHER DATA AND DATA EXCHANGE WITH LOCAL PERIPHERALS

[75] Inventors: Bryan R. Martin, Campbell; Keith Barraclough, Menlo Park, both of Calif.

[73] Assignee: 8×8 Inc., Santa Clara, Calif.

[21] Appl. No.: 08/977,568

[22] Filed: Nov. 25, 1997

[51] Int. Cl.[7] .............................. G06F 3/00; G06F 13/14

[52] U.S. Cl. .............................. 710/72; 345/15; 379/202; 709/207; 710/16; 710/42; 710/63

[58] Field of Search .............................. 395/880, 836, 395/673, 551, 883; 380/29; 381/81; 600/410; 711/151; 348/15; 379/202; 709/207; 710/60, 63, 16, 42, 72; 713/400

[56] References Cited

U.S. PATENT DOCUMENTS

| | | | |
|---|---|---|---|
| 3,953,835 | 4/1976 | Cuccio et al. | 395/880 |
| 5,305,384 | 4/1994 | Ashby et al. | 380/29 |
| 5,333,299 | 7/1994 | Koval et al. | 395/551 |
| 5,379,351 | 1/1995 | Fandrianto et al. . | |
| 5,495,294 | 2/1996 | Katz | 348/15 |
| 5,524,235 | 6/1996 | Larson et al. | 711/151 |
| 5,551,430 | 9/1996 | Blakeley et al. | 600/410 |
| 5,572,582 | 11/1996 | Riddle | 379/202 |
| 5,594,813 | 1/1997 | Fandrianto et al. . | |
| 5,630,174 | 5/1997 | Stone, III et al. | 395/883 |
| 5,675,375 | 10/1997 | Riffe | 348/15 |
| 5,761,320 | 6/1998 | Farinelli et al. | 381/81 |
| 5,978,014 | 11/1999 | Martin et al. | 348/15 |

OTHER PUBLICATIONS

BAV99LT1 Dual Switching Diode, Motorola Semiconductor Technical Data, Motorola, 1996.

U.S.Robotics Brochure: USR/Palm Computing—PalmPilot Facts and Figures.

DB–9 (PC/AT) Serial Port Pinout.

International Telecommunication Union, "Line Transmission of Non–Telephone Signals / Terminal for Low Bitrate Multimedia Communication," DRAFT ITU–T Recommendation H.324, 37 pages (Nov. 22, 1995).

"Le bus 12C Presentation," http://www.planete.net/~surbanov/i2c/intro.html, 10 pages (Oct. 10, 1997).

*Primary Examiner*—Thomas C. Lee
*Assistant Examiner*—Albert Wang

[57] ABSTRACT

A multimedia communication arrangement communicating video and at least one other data type using a communication channel includes a first interface arrangement for communicating video and the at least one other data type using the communication channel. A second interface arrangement exchanges data with, and provides power to, at least one of a variety of peripheral devices. A video data signal processor circuit processes the video data and sends the video data along with the at least one other data type over the first interface arrangement and communicates with the peripheral devices over the second interface arrangement.

26 Claims, 6 Drawing Sheets

COMMUNICATION INTERFACE BETWEEN REMOTE TRANSMISSION OF BOTH COMPRESSED VIDEO AND OTHER DATA AND DATA EXCHANGE WITH LOCAL PERIPHERALS

FIELD OF THE INVENTION

The present invention relates generally to video communication systems and, more particularly, to interfacing video communication systems with peripheral devices.

BACKGROUND OF THE INVENTION

The widespread use of digital processing technology has found its way into a variety of equipment and, in some form, into most industries. In many applications involving communication of different types of information, data processing arrangements have been configured to multiplex information from each type of information source over various communication-media types and arrangements.

Video communication applications of this technology have become increasingly popular. Videoconferencing, for example, is becoming more common in both business and residential applications. Videoconferencing permits audio as well as visual live communication between two remotely located terminals communicating over a single channel. Videoconferencing has had limited success due to, for example, unavailability of a common network interface, overly complex controls, poor video quality, limited functionality, inconvenience, and high cost. Improving video quality and functionality while simultaneously decreasing costs has proven to be a seemingly unobtainable goal. For this reason, there have been opposing pressures to develop certain other systems that forego the convenience and quality criteria for the sake of reducing costs.

In some videoconferencing applications, it is desirable to make use of additional functions to supplement audio and video capabilities. For example, in certain applications involving multiple participants at one or more of the terminals, dedicating a videocamera to each participant facilitates better viewing of each participant. Similarly, dedicating a microphone to each participant makes each participant easier to hear. In certain applications, it is desirable to print paper copies of transmitted images. Peripheral devices that can be used to provide these additional functions use a wide variety of input or output ports and communication protocols. Furthermore, the devices are accessed using a variety of types of software. Attempting to implement such a variety of ports, protocols, and software has been difficult and expensive. Moreover, additional ports tend to increase the physical size of the base unit.

One recent approach that attempts to address some of the above-mentioned issues uses a digital videocamera coupled to an input port of a PC that is programmed to provide videoconferencing over a communications channel, such as the Internet. Peripheral devices, such as additional videocameras, microphones, and printers, can be installed on respective ports of the PC. This approach is useful for applications where a PC is readily available and the user is fully familiar with downloading the software and using the PC to control the videoconferencing. However, the approach is disadvantageous for environments directed to those who are not as computer literate or not interested in using a computer for videoconferencing. In addition, PC's typically have a limited number of available ports, thus limiting the number of peripheral devices that can be connected.

SUMMARY OF THE INVENTION

According to one embodiment of the present invention, a multimedia communication arrangement communicating video and at least one other data type using a communication channel comprises a first interface arrangement configured and arranged to communicate video and said at least one other data type using the communication channel. A second interface arrangement is configured and arranged to exchange data with and to provide power to at least one of a variety of peripheral devices. A video data signal processor circuit is configured and arranged to process the video data and send the video data along with said at least one other data type over the first interface arrangement, to determine a data rate at which to communicate over the second interface arrangement according to information received from said at least one of a variety of peripheral devices and to communicate with said at least one of the variety of peripheral devices over the second interface arrangement.

In another embodiment, a multimedia communication arrangement communicating video and at least one other data type using a communication channel includes an interface arrangement configured and arranged to exchange data with at least one of a variety of peripheral devices. A data signal processor is responsive to the interface arrangement and is configured and arranged to detect types of peripheral devices exchanging data with the interface arrangement. The data signal processor is further configured and arranged to exchange data with the peripheral devices using a preselected priority scheme.

According to another embodiment of the present invention, an interface arrangement for use in a multimedia communication arrangement communicating video and at least one other data type using a communication channel includes a first terminal configured and arranged to transceive a data signal with a peripheral device and to provide an indication of a type of the peripheral device to the multimedia communication arrangement. A second terminal is configured and arranged to exchange an audio signal with the peripheral device. A third terminal is configured and arranged to exchange a video signal with the peripheral device. The multimedia communication arrangement transceives data with the peripheral device at a time selected as a function of the indicated type.

In still another embodiment of the present invention, an interface arrangement is used to exchange data with at least one of a variety of peripheral devices. The types of the peripheral devices exchanging data with the interface arrangement are detected. Data is exchanged with the peripheral devices at times selected as a function of the detected types. These steps can be performed using a multimedia communication arrangement.

According to another method embodiment of the present invention, video and at least one other data type are communicated using a communication channel and a first interface arrangement. Data is exchanged with at least one of a variety of peripheral devices using a second interface arrangement. The video data is sent along with said at least one other data type over the first interface arrangement. The second interface arrangement is used to communicate with said at least one of the variety of peripheral devices. This method can be performed by a multimedia communication arrangement.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

Other aspects and advantages of the present invention will become apparent upon reading the following detailed description and upon reference to the drawings in which.

Figure 1:
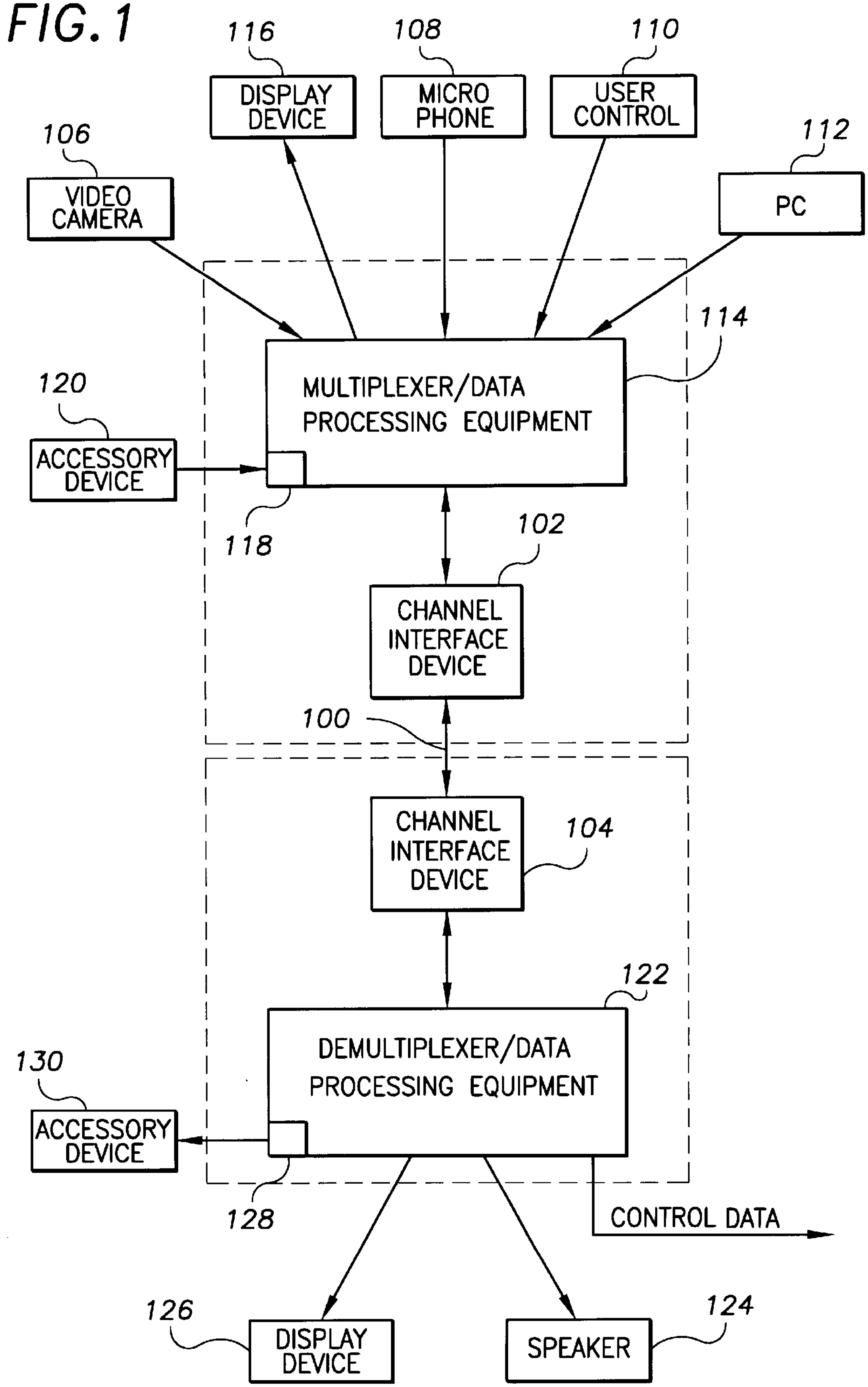
FIG. 1 is a block diagram of an example video communication system, according to a particular embodiment of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is generally applicable to various types of data processing environments in which a video communication system, e.g., a videoconferencing system, uses one or more peripheral devices to supplement its own capabilities. For example, in certain applications, it is desirable that the videoconferencing system use multiple videocameras to facilitate capturing of images of multiple targets. Other types of peripheral devices, including, but not limited to, dialers, forms of remote controls, printers and speakerphones, can be used to extend the capabilities of the videoconferencing system. According to one aspect of the present invention, the video communication system uses a uniform protocol to communicate with such peripheral devices through an interface. Using a single protocol enhances the versatility of the videoconferencing system, allowing the use of a wide variety of peripheral devices in connection with the videoconferencing system. This allows easy customization and reconfiguration of the videoconferencing system.

Turning now to the drawings, FIG. 1 illustrates a data processing system for a videoconferencing application. The system includes data sending equipment depicted above a communication channel 100 of FIG. 1 and data receiving equipment depicted below the communication channel 100. While the sending and receiving of such data is often reciprocal in many data processing applications of this type as with the instant videoconferencing illustration, the configuration illustrated in FIG. 1 is simplified in this regard to facilitate the discussion.

At the sending end of the system of FIG. 1, a transmitting channel interface device 102 is used to send processed data over the communication channel 100 to a receiving channel interface device 104. The data that is presented to the channel interface device 10 is collected from various types of data sources including, for example, a videocamera 106, a microphone 108, a user control device 110, and a conventional personal computer 112. The data sources typically use buffers to store the data to be collected. The data collected from each of these data sources is received by multiplexer/data processing equipment (MDPE) 114. The MDPE 114 monitors the available channel bandwidth and, based on its capacity to transmit additional data, collects and formats the data collected from each of the input sources so as to maximize the amount of data to be transmitted over the channel 100. A monitor or other type of display device 116 is optionally used with the videocamera 106 to monitor the manner in which video images are captured by the videocamera 106. An interface 118 facilitates the transfer of data between the MDPE 114 and a peripheral or accessory device 120. The accessory device 120 can be implemented using any of a variety of peripheral devices, including, for example, a speakerphone, a keyboard, a keypad, an infrared (IR) transceiver, a printer, and a videocamera. It should be understood that the interface 118 can be used to exchange data between the MDPE 114 and a plurality of accessory devices 120. In a particular embodiment of the present invention, a plurality of accessory devices 120 are connected on the same two-wire bi-directional serial bus, using an open collector bus connection arrangement. In another particular embodiment of the present invention, for example, the interface 118 exchanges data between the MDPE 114 and microphones and/or videocameras distributed around a conference room and assigned to conference participants. By monitoring audio levels present on the microphones, the MDPE 114 can determine which participant is currently speaking and activate his or her assigned videocamera. Moreover, the MDPE 114 can command a videocamera to pan, tilt, and/or zoom to capture a better image of the speaking participant or another scene of interest. The MDPE 144 can also be used via control from a remote site, for example, implementing the accessory device 120 in the form of a security pod or interface device, in which remote control signals are sent to the security pod to command the MDPE 114 to select a videocamera and use a particular videocamera (which may be one of several possible selectable video cameras) as the video input source for the communication channel 100.

The interface 118 allows the MDPE 114 to query the accessory device 120 to determine its type. The MDPE 114 determines the type of accessory device 120 to establish how it should receive and/or transmit information to the accessory device, based on a selected data rate, and to resolve any contentions between various types of accessory devices connected to the same bidirectional bus and/or between one or more of the accessory devices 120 and input devices connected to the MDPE 114 through other interface ports. To resolve contention between various types of accessory devices connected on the same bi-directional bus, each accessory device 120 is configured to take control of the bus only if the line levels on the bus indicate that the bus is not currently being utilized by another peripheral device 120. This can be implemented using any of a variety of conventional contention priority schemes for daisy-chain type connectivity. Contention between a particular type of accessory device 120 and another input device connected through another port is handled by a pre-established priority scheme controlled by the MDPE 114. The MDPE 114 resolves the contention by accessing a priority scheme in its memory and sending the data from the accessory device 120 having the highest priority. As a specific example, if a microphone is attempting to send audio data while a facsimile machine is trying to send control data, the MDPE 114 sends the audio data first. The MDPE 114 also formats data for presentation to the accessory device 120 using a protocol selected as a function of the type of the accessory device 120.

At the lower end of the system of FIG. 1, the formatted data communicated over the channel 100 is received by the channel interface device 104, which then presents the received data to demultiplexer/data processing equipment (DDPE) 122. The DDPE 122 is set up to sort out the formatted data received over the channel 100 according to instructions previously sent by the MDPE 114. The demultiplexed data is then presented to the appropriate output source equipment, including audio data to a speaker 124, video data to a monitor 126, and control data to external equipment for subsequent processing, or has been further processed internally.

An interface 128 is used to interface the DDPE 122 with a peripheral or accessory device 130. The accessory device 130 can be implemented using any of a variety of peripheral devices, including, for example, a speakerphone, a keyboard, a keypad, an IR transceiver, a printer, and a videocamera. It should be understood that the interface 128 can be used to interface the DDPE 122 with more than one accessory device 130. It should further be understood that both of the interfaces 118 and 128 need not be present. For example, equipment having an interface 118 can be used to communicate with equipment without such an interface.

It will be understood that the processor-based circuit shown above in FIG. 1 can be implemented using any of a variety of processor arrangements, including the arrangements disclosed in U.S. patent application Ser. Nos. 08/692993 and 08/658917, respectively entitled and relating to issued patents also entitled "Programmable Architecture and Methods for Motion Estimation" (U.S. Pat. No. 5,594,813) and "Video Compression and Decompression Processing and Processors" (U.S. Pat. No. 5,379,351). These applications and issued patents are incorporated herein by reference.

According to a particular embodiment of the present invention, depicted using the broken lines in FIG. 1, the MDPE 114 and the channel interface device 102 share the same unitary structure, such as a VC50, VC55, or VC100-type modular videophone, commercially available from 8x8, Inc.

Figure 2:
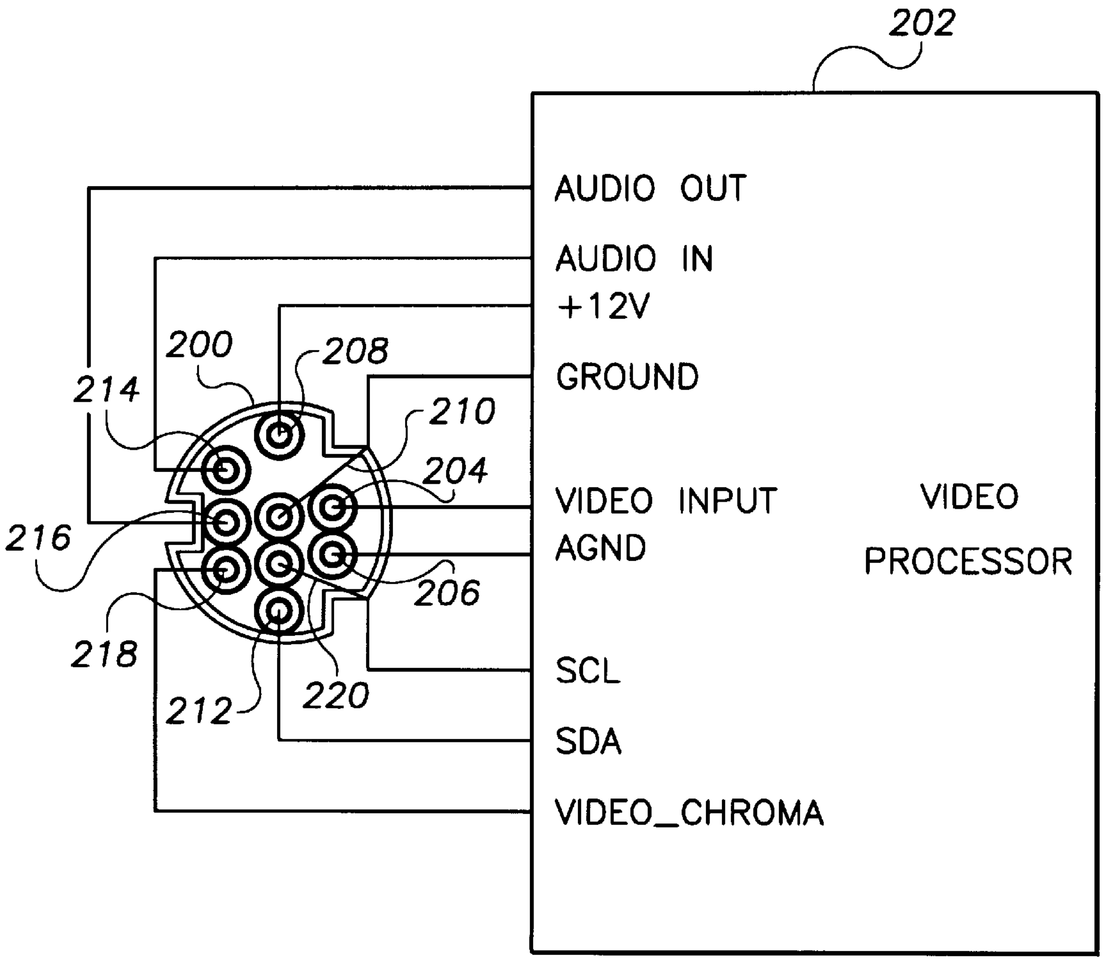
FIG. 2 illustrates an example terminal configuration for use with an interface according to an embodiment of the present invention.

FIG. 2 illustrates an example terminal configuration that can be used to implement an interface according to an embodiment of the present invention. A connector 200 communicates signals between a video processor 202 and a peripheral device (not shown) using a plurality of terminals. A video input terminal 204 provides a line-level video signal to the peripheral device. The video processor 202 can configure itself to provide, for example, either a composite video signal or a luminance/chrominance (Y/C) signal (e.g., S-video) to the peripheral device. This configuration is performed, for example, based on a determination of the type of peripheral device connected to the connector 200.

An analog ground reference terminal 206 provides a ground reference or return for analog input/output (I/O) signals. A direct current (DC) power terminal 208 supplies power to the peripheral device. This terminal receives DC power from the videoconferencing arrangement. The DC power terminal 208 provides a DC signal of between approximately 12 and 20 volts with a maximum load of, for example, 0.5 amperes. A DC power return terminal 210 provides a return path for DC power. In one example implementation, the DC power return terminal 210 is distinct from the analog ground reference terminal 206.

A data terminal 212 communicates data signals between the video processor 202 and the peripheral device using a two-wire bi-directional serial bus. According to one example embodiment, the two-wire bi-directional serial bus is implemented in the form of an inter integrated circuit ($I^2C$) bus. In one particular application using this $I^2C$ bus, the data signal complies with a conventional $I^2C$ signal specification. For compatibility, the peripheral device is 400K Bps compliant. The interface receives data from the peripheral devices in their native formats, e.g., keyboard scan codes and IR transmission protocol, and translates that data into the selected communication format.

An audio input terminal 214 provides a line-level audio input to the peripheral device. This audio input signal can be advantageously used by a variety of peripheral device types, including, for example, audio-capable cameras and handset/speakerphone devices. An audio output terminal 216 provides a line-level audio output signal to the peripheral device for use by a variety of peripheral devices, including, for example, handset and speakerphone devices.

A video input terminal 218 provides a line-level video chroma signal input to the peripheral device. The video processor 202 can configure itself to provide, for example, either a composite or Y/C chroma signal to the peripheral device based on the type of peripheral device as detected by the video processor 202. The chroma signal is consistent with line-level video, standard chroma (S-video) signal levels.

A clock terminal 220 communicates a clock signal between the video processor 202 and the peripheral device using the bi-directional bus. The bi-directional bus used with the interface employs a multi-master messaging structure. Peripheral devices connected to the interface operate independently and send messages to the videoconferencing arrangement when they have information to communicate. This messaging structure uses system resources more efficiently than systems in which the videoconferencing arrangement polls the peripheral devices. Further, this structure allows peripheral devices to immediately identify their connectivity upon engagement without cycling power, sometimes referred to as "hot-plugged" devices.

Figure 3:
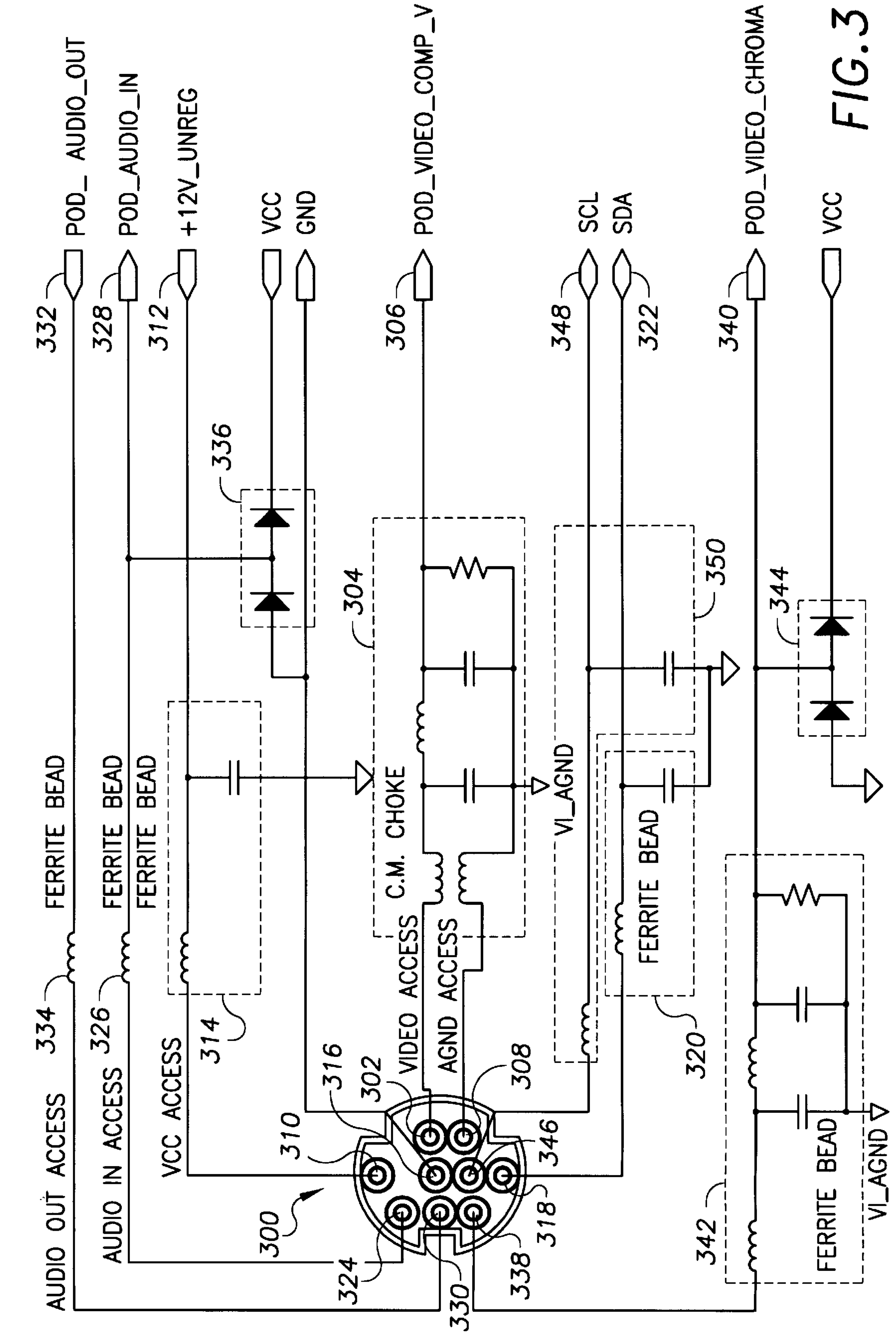
FIG. 3 is a schematic diagram illustrating an example circuit arrangement for implementing an interface according to an embodiment of the present invention.

FIG. 3 is a schematic diagram illustrating an example circuit arrangement implementing an interface according to an embodiment of the present invention. A connector 300 provides connectivity between a peripheral device (not shown) and a video communication arrangement (not shown). A video input terminal 302 provides a line-level video input signal to the peripheral device. The video input terminal 302 is coupled to the video communication arrangement using a low pass filter 304 and provides a composite or Y/C luminance signal through an output 306. An analog ground reference pin 308 provides a ground reference for analog signals and is grounded through the low pass filter 304.

A DC power terminal 310 receives power from the video communication arrangement through an input 312. A low-pass filter 314 filters out high frequency noise from the power signal. The filtered power signal is provided to the peripheral device. A DC power return terminal 316 provides a return path for the DC power.

A data terminal 318 communicates data between the video communication arrangement and the peripheral device using a conventional-type signal. The data signal is filtered using a low pass filter 320 and is communicated through a bi-directional/output 322 through a bi-directional bus.

An audio input terminal 324 provides a line-level audio input signal from the peripheral device to the video communication arrangement. The audio input signal is AC coupled and has a 1 volt root mean square (RMS) line level. A ferrite bead 326 provides an input impedance of, for example, 47K Ω. The audio input signal is provided to the video communication arrangement using an output 328. An audio output terminal 330 provides a line-level audio output signal from the video communication arrangement to the peripheral device using an input 332. The audio output signal also has a 1 volt RMS line level and is AC coupled. A ferrite bead 334 provides an input impedance of, for example 47K Ω.

A dual series switching diode 336 provides surge and high voltage protection to the node at the output 328. The dual series switching diode 336 can be implemented using, for example, a BAV99LT1-type device, commercially available from Motorola, Inc.

A video input terminal 338 provides a line-level video chroma input signal through an output 340. The video communication arrangement can configure itself to provide, for example, either of a composite or Y/C chroma signal using standard chroma (S-video) levels. The video chroma input signal is filtered using a low pass filter 342. A dual series switching diode 344 provides surge and high voltage protection to the node at the output 340. The dual series switching diode 344 can be implemented using, for example, a BAV99LT1-type device, commercially available from Motorola, Inc. A clock terminal 346 communicates a clock signal through a bi-directional input/output 348 to the $I^2C$ bus. The clock signal is filtered using a low pass filter 350.

Figure 4:
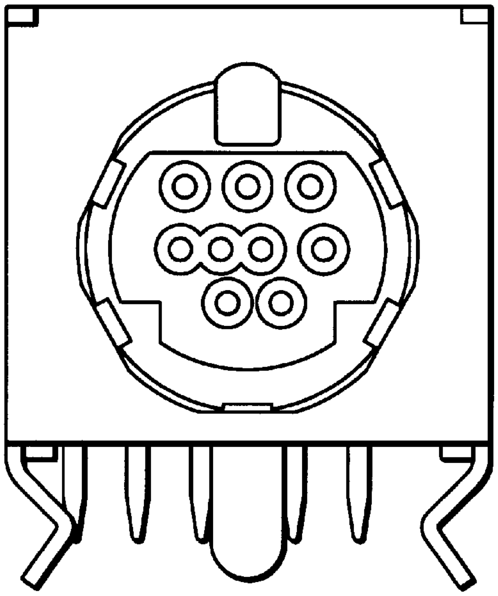
FIG. 4 is an elevational view of an example interface according to an embodiment of the present invention.
Figure 5:
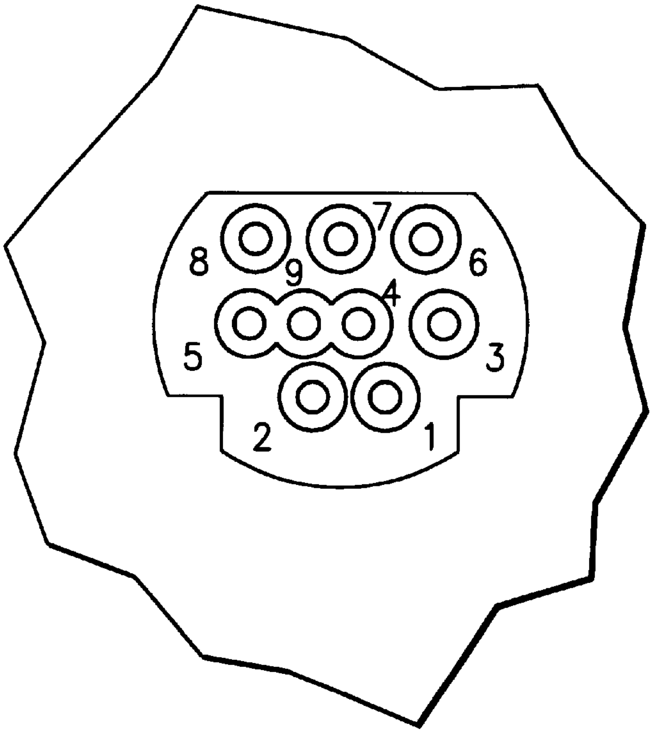
FIG. 5 is an elevational view of part of the interface illustrated in FIG. 4.

FIGS. 4 and 5 illustrate example physical views of a connector implementing part of an interface, according to a particular embodiment of the present invention. FIG. 4 illustrates the connector 400 situated within a housing 402. Example signal connections for the connector 400 are shown in greater detail in FIG. 5.

The interface communicates signals between the video communication equipment and the peripheral device or devices using a communication protocol. The bi-directional bus is a multi-master system, such that the video communication arrangement acts as both master and slave at various times. Similarly, the peripheral device or devices also act as masters and slaves at various times. In particular, devices that are initiating data transfers on the bus become the bus master for the respective data transfer cycle. To configure and/or control the peripheral devices or the video communication arrangement, the master device both transmits data to and receives data from slave devices. This form of communication is typically sparse and is used primarily for initializing devices. To transmit data streams using, e.g., RS-232 interfaces, keyboards or keypads, and similar devices, master devices only transmit data and slave devices only receive data. This form of communication is preferably bursty to avoid inefficiently using the band width of the bus. Each master data stream device preferably has sufficient buffers or first-in-first-out (FIFO) memories to be able to send data in relatively long bursts in order to reduce overhead related to addressing.

For configuration and control communications, the protocol begins with a START condition. An address byte follows the START condition and contains a read/write bit that identifies the device to be addressed. An optional sub-address identifies a particular register to be accessed. Zero or more data bytes follow the address byte or sub-address. A STOP condition ends the protocol. For data stream communications, the protocol consists of, for example, a START condition. An address byte with the read/write bit set to write identifies the device to be addressed. An optional sub-address byte identifies a particular stream to which the data is to be sent, if the device has more than one stream. The data stream itself consists of one or more data bytes. The protocol ends with a STOP condition. Due to the similarity of addressing for configuration and control communications and data stream communications, sub-addresses should be assigned carefully to avoid conflicts.

The address indicates which device is being addressed by a bus master. It should be noted that if a device never needs to be written to or polled, it does not need an assigned address. For example, a keypad scanner only sends key-transition data to the video communication arrangement keypad data stream. The keypad scanner need not be configured and does not use received data. Accordingly, it does not need to have an assigned address. Peripheral device types, according to one example of the implementation, are predefined per the manufacturer code identification for the particular device type, and addresses for the arrangement can be dynamically allocated or predefined, as chosen for the applicable signal arbitration scheme.

The data stream devices have one or more sub-addresses or stream addresses that serve to direct the data stream to specific functions within the device. For example, the video communication arrangement may have the addresses 0x40 and 0x41. These addresses are used to allow peripheral devices to send data to the various data streams maintained by the video communication arrangement. For example, a keyboard data stream having a stream address of, for example, 0x00, accepts keyboard data from a keyboard peripheral device. Another stream, which may have the sub-address 0x01, accepts keypad data from a keypad peripheral device. Still another data stream, having a sub-address of, for example, 0x02, accepts data from an external device, for example, a laptop computer, and transmits the data using a data channel. The data channel is configured and arranged to be compatible with a videoconferencing standard, such as the ITUH.324 recommendation. The data stream can also accept data from, for example, a TTY device, an example of which is described in a co-pending U.S. patent application Ser. No. 08/934,184 (docket number 11611.43-us-01), filed Sep. 19, 1997, now U.S. Pat. No. 5,978,014 and incorporated herein by reference. The video communication arrangement uses another address or addresses to send control or stream data to a keyboard peripheral device. This address may be assigned, for example, as 0x50 and 0x51.

To handle data streams received in a variety of formats, the video communication arrangement makes certain assumptions about the data streams. For example, it is assumed that all data is formatted in 8-bit bytes. It is further assumed that data from incoming data streams other than base and stream addresses is passed through to the respective application. Furthermore, it is assumed that data sent from applications is passed through to respective output streams, with base and stream addresses appended.

Figure 6:
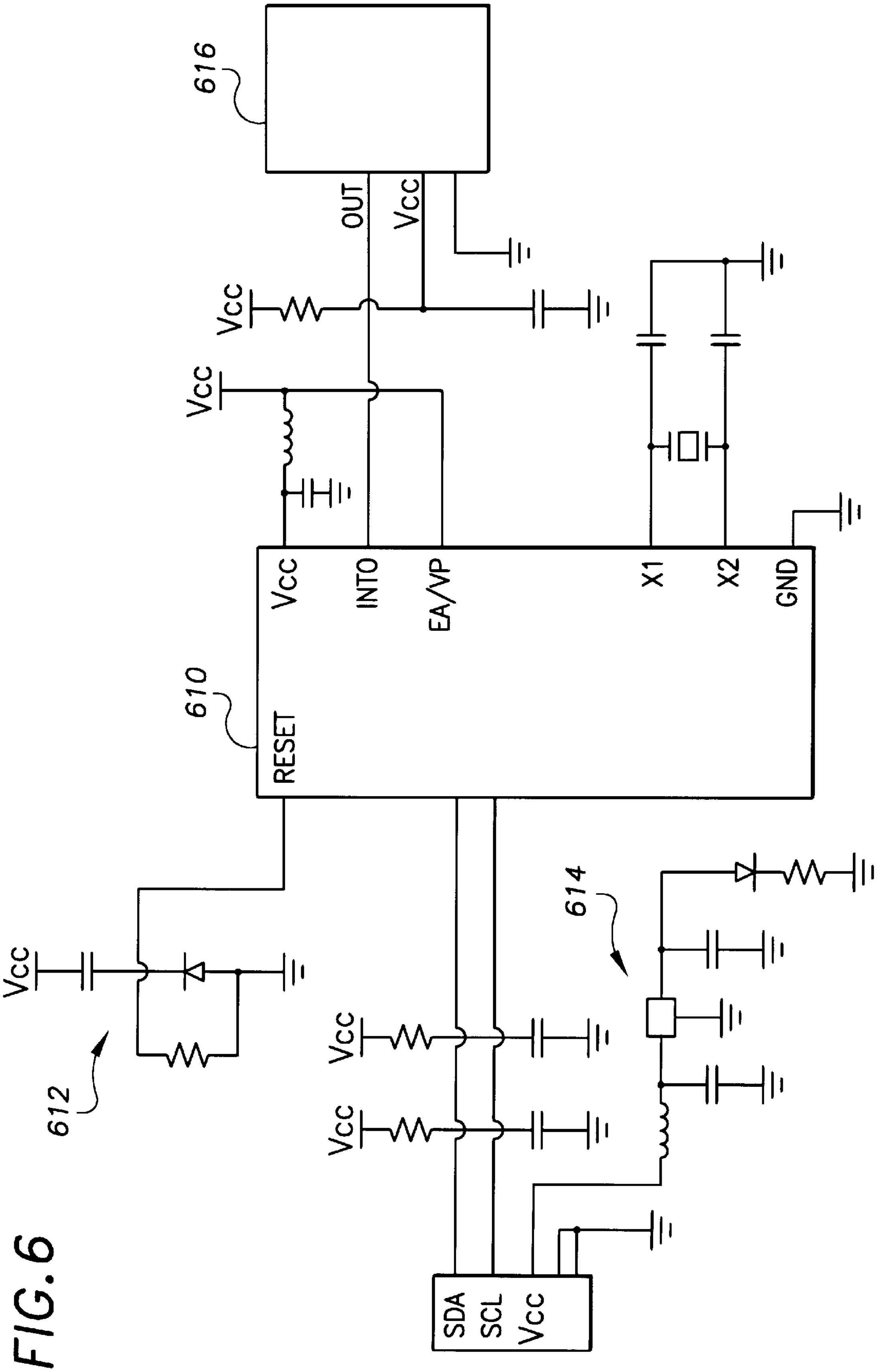
FIG. 6 illustrates an example arrangement for use in interfacing a peripheral device with a data bus, according to another embodiment of the present invention.

FIG. 6 illustrates an example arrangement for connecting a wireless keyboard receiver to an interface according to an example embodiment of the present invention. The video communication arrangement powers the infrared receiver, as provided by the connector signals at $V_{cc}$ and common. A commercially available microcontroller (e.g., an S87C652-4N40 by Signetics) chip 610 is used to translate the received IR signals to the data and control signals as implemented by the SDA and SCL interface. A conventional RC power up circuit is used for startup control of the chip 610. The arrangement further includes a conventional voltage regulating circuit 612 and an IR sensor 616, such as an ACIR9-8x8 available from Sejin Electron, Inc. (of Santa Clara, Calif., and Taiwan) for converting the received light signals to the microcontroller chip 610.

Figure 7:
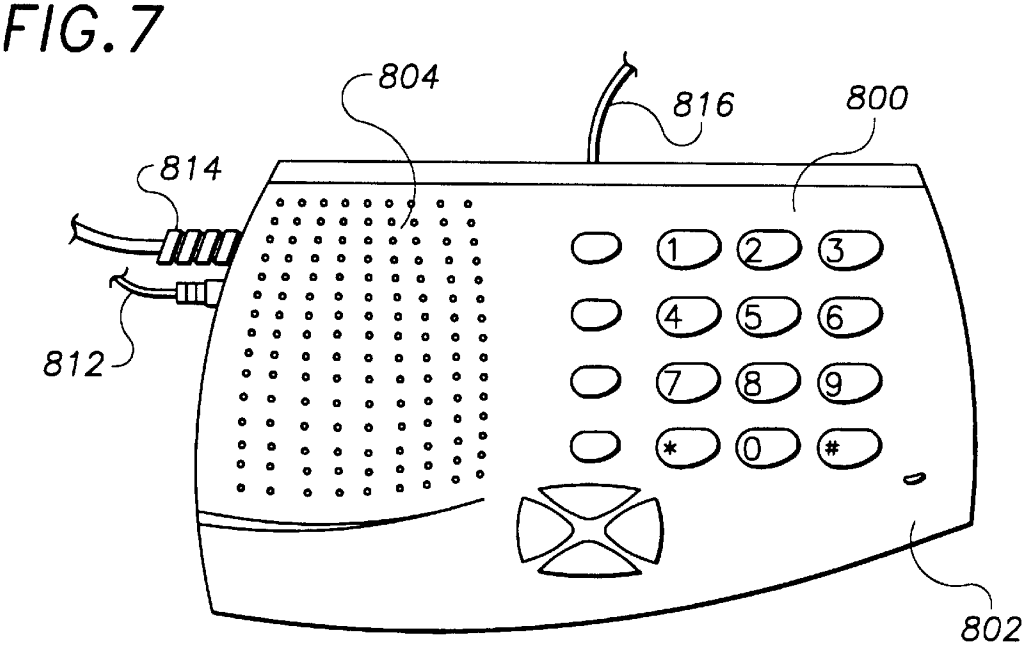
FIG. 7 illustrates a plan view of an example peripheral device for use with an interface according to another embodiment of the present invention.
Figure 8:
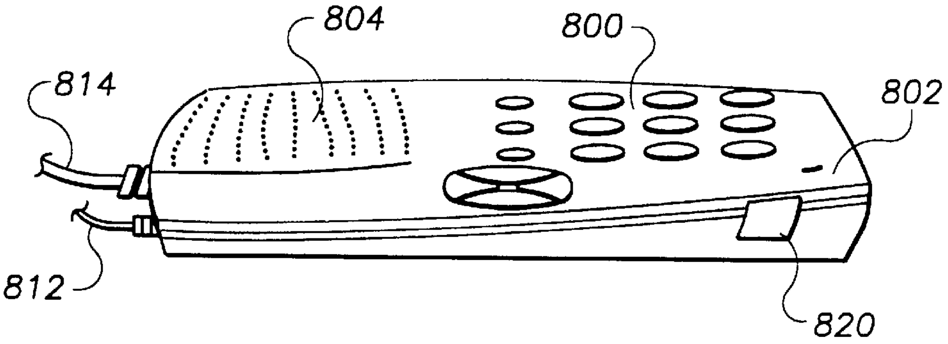
FIG. 8 illustrates an elevational view of the device depicted in FIG. 7
Figure 9:
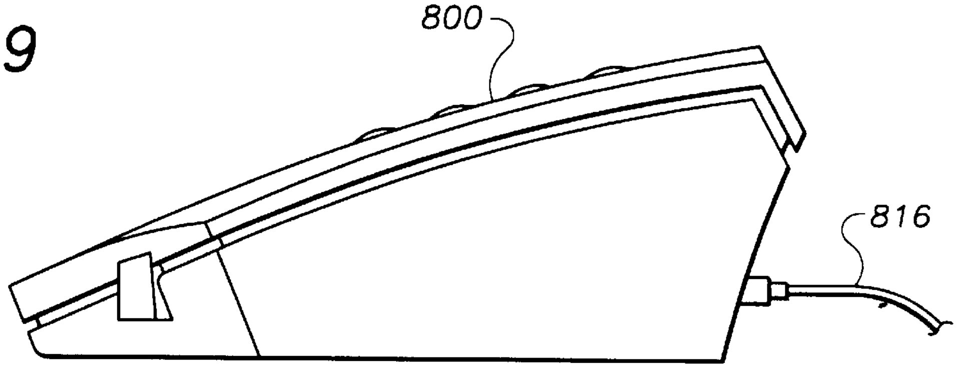
FIG. 9 illustrates a profile view of the device illustrated in FIGS. 7 and 8.

FIGS. 7–9 respectively illustrate plan, elevational, and profile views of an example peripheral device for use with the interface shown in FIG. 4. The example peripheral device functions as a speakerphone and as a dialer. The peripheral device also provides infrared and RS-232 data communication capabilities. The device is powered by the video communication arrangement. A numeric keypad 800 allows a user to dial a telephone number. A microphone 802 and a speaker 804 provide speakerphone capabilities. The peripheral device also includes a 9600 baud RS-232 communication port and an integrated infrared receiver. FIGS. 7 and 8 illustrate the bi-directional serial bus interface and connector, as depicted at 814 and which is connectable to a videoconferencing unit as previously described. Further, a separate but similarly-designed bi-directional serial bus, as depicted at 812, is optionally provided to permit daisy-chain interconnection of various types of peripheral devices (as depicted at 120 of FIG. 1). A wired data interface is shown at 816 of FIG. 7 to receive control data from a data input source. In FIG. 8, an IR sensor is depicted behind an IR window 820 and is used for receiving infrared signals from the same or another type of data input source. The IR sensor behind the window 820 of FIG. 8 can be used in place of, or concurrently with, the wire data interface as depicted at 816 at FIG. 7.

While the disclosed embodiments have been presented as representative implementations, other embodiments of the present invention will be apparent to those skilled in the art from consideration of the overall specification and practice of the invention disclosed herein. It is intended that the specification and examples be considered as exemplary only, with a true scope and spirit of the invention being indicated by the following claims.

What is claimed is:

1. A multimedia communication arrangement communicating video and at least one other data type with a remotely-located video-communicator over a communication channel, comprising:

a first interface arrangement configured and arranged to communicate compressed video and said at least one other data type to the remotely-located video-communicator using the communication channel;

a second interface arrangement configured and arranged to provide power to and to exchange data with at least one of a variety of peripheral devices using a uniform protocol and a uniform connector; and a video data signal processor circuit configured and arranged to process the video data and send the video data along with said at least one other data type using the first interface arrangement, to determine a data rate at which to communicate using the second interface arrangement according to encoded information received via the first interface arrangement from said at least one of the variety of peripheral devices, and to communicate with said at least one of the variety of peripheral devices using the same second interface arrangement.

2. A multimedia communication arrangement, according to claim 1, wherein the exchanged data comprises at least one of a clock signal and a data signal.

3. A multimedia communication arrangement, according to claim 2, wherein said at least one of the clock signal and the data signal is $I^2C$-compliant.

4. A multimedia communication arrangement communicating video and at least one other data type with a remotely-located video-communicator over a communication channel, according to claim 1, wherein the video data signal processor circuit includes a DSP circuit adapted to compress the video data and another processor adapted for functions other than compressing the video data.

5. A multimedia communication arrangement communicating compressed video and at least one other data type with a remotely-located video-communicator over a communication channel, comprising:

an interface arrangement configured and arranged to exchange data with at least one of a variety of peripheral devices using a uniform protocol and a uniform connector; and a data signal processor responsive to the interface arrangement and configured and arranged to process the compressed video, detect types of peripheral devices exchanging data with the interface arrangement by decoding encoded information received via the interface arrangement, and exchange data with the peripheral devices using a preselected priority scheme using a data array selected according to information received from a corresponding one of the peripheral devices.

6. A multimedia communication arrangement, according to claim 5, wherein the interface arrangement comprises a bi-directional serial bus.

7. A multimedia communication arrangement, according to claim 6, wherein the bi-directional serial bus is configured and arranged to use a multi-master communication protocol to exchange data with the at least one of a variety of peripheral devices.

8. A multimedia communication arrangement, according to claim 6, wherein the bi-directional serial bus is configured and arranged to use a bi-directional serial communication protocol to exchange data with the at least one of a variety of peripheral devices.

9. A multimedia communication arrangement, according to claim 5, wherein the interface arrangement is configured and arranged to exchange data with the at least one of a variety of peripheral devices using at least one of an RS-232 communication protocol and an IRDA communication protocol.

10. A multimedia communication arrangement, according to claim 5, wherein the data signal processor is further configured and arranged to select at least one protocol for presenting data to the peripheral devices exchanging data with the interface arrangement based on the detected types.

11. A multimedia communication arrangement communicating compressed video and at least one other data type with a remotely-located video-communicator over a communication channel, according to claim 4, wherein the data signal processor includes a DSP circuit adapted to compress the video data and another processor adapted for functions other than compressing the video data.

12. For use in a multimedia communication arrangement communicating video and at least one other data type with a remotely-located video-communicator over a communication channel, an interface arrangement, comprising:

a first terminal configured and arranged to transceive a data signal with a peripheral device using a uniform protocol and a uniform connector and to provide a code indicating a type of the peripheral device to the multimedia communication arrangement;

a second terminal configured and arranged to exchange an audio signal with the peripheral device; and a third terminal configured and arranged to exchange a video signal with the peripheral device; and a processor arrangement coupled to the first terminal wherein the processor arrangement is adapted to: compress the video signal for transmission over the communication channel to the remote video communicator, decode the code to determine the indicated type of the peripheral device, and transceive data with the peripheral device at a time selected as a function of the indicated type.

13. An interface arrangement, according to claim 12, wherein the interface arrangement further comprises a bi-directional serial bus.

14. An interface arrangement, according to claim 13, wherein the bi-directional serial bus is configured and arranged to use a multi-master communication protocol to exchange data with the peripheral device.

15. An interface arrangement, according to claim 13, wherein the bi-directional serial bus is configured and arranged to use a bi-directional serial communication protocol to exchange data with the peripheral device.

16. An interface arrangement, according to claim 12, wherein the interface arrangement is further configured and arranged to exchange data with the peripheral device using at least one of an RS-232 communication protocol and an IRDA communication protocol.

17. An interface arrangement, according to claim 12, wherein the interface arrangement is further configured and arranged to present data to the peripheral device using a protocol selected based on the indicated type.

18. An interface arrangement, according to claim 12, wherein the peripheral device comprises at least one of a speakerphone, a keyboard, a keypad, an IR transceiver, a printer, and a videocamera.

19. For use in a multimedia communication arrangement communicating video and at least one other data type with a remotely-located video-communicator over a communication channel, an interface arrangement, according to claim 12, wherein the processor arrangement includes a DSP circuit adapted to compress the video data and another processor adapted for functions other than compressing the video data.

20. For use in a multimedia communication arrangement communicating video and at least one other data type with a remotely-located video-communicator over a communication channel, a method comprising:

using an interface arrangement to exchange data with at least one of a variety of peripheral devices using a uniform protocol and a uniform connector;

detecting types of peripheral devices exchanging data with the interface arrangement by decoding a code received from said at least one of a variety of peripheral device;

compressing video data for transmission over the communication channel to the remotely-located video communicator, exchanging data with the peripheral devices at times selected as a function of the detected types; and transmitting the compressed video data along with the data exchanged over the communication channel to the remotely-located video communicator.

21. A method, according to claim 20, further comprising using a bi-directional serial bus to exchange data with the at least one of a variety of peripheral devices.

22. A method, according to claim 21, further comprising using a multi-master protocol to exchange data with the at least one of a variety of peripheral devices.

23. A method, according to claim 21, further comprising using a bi-directional serial communication protocol to exchange data with the at least one of a variety of peripheral devices.

24. A method, according to claim 20, further comprising exchanging data with the at least one of a variety of peripheral devices using at least one of an RS-232 communication protocol and an IRDA communication protocol.

25. A method, according to claim 20, further comprising selecting at least one protocol for presenting data to the peripheral devices exchanging data with the interface arrangement based on the detected types.

26. A multimedia communication arrangement communicating video and at least one other data type with a remotely-located video-communicator over a communication channel, comprising:

means for using an interface arrangement to exchange data with at least one of a variety of peripheral devices using a uniform protocol and a uniform connector;

means for detecting types of peripheral devices exchanging data with the interface arrangement by decoding a code received from said at least one of a variety of peripheral device;

means for compressing video data;

means for exchanging data with the peripheral devices at times selected as a function of the detected types and means for transmitting the compressed video data along with the data exchanged over the communication channel to the remotely-located video communicator.

* * * * *

UNITED STATES PATENT AND TRADEMARK OFFICE

CERTIFICATE OF CORRECTION

PATENT NO. : 6,119,178
DATED : September 12, 2000
INVENTOR(S) : Martin et al.

It is certified that error appears in the above-identified patent and that said Letters Patent is hereby corrected as shown below:

Column 9,
Line 63, “first” should read -- second --.

Column 10,
Line 60, “claim 4” should read -- claim 5 --.

Column 12,
Line 44, “device” should read -- devices --.

Signed and Sealed this

Twenty-third Day of September, 2003

JAMES E. ROGAN
*Director of the United States Patent and Trademark Office*